United States Patent
Grevers, Jr.

(10) Patent No.: US 10,560,187 B2
(45) Date of Patent: Feb. 11, 2020

(54) VISIBLE LIGHT COMMUNICATIONS NETWORK WAVELENGTH FILTER FOR SECURITY AT TRANSPARENT STRUCTURES

(71) Applicant: CISCO TECHNOLOGY, INC., San Jose, CA (US)

(72) Inventor: Theodore Grevers, Jr., Milford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 5 days.

(21) Appl. No.: 15/454,591

(22) Filed: Mar. 9, 2017

(65) Prior Publication Data

US 2018/0262269 A1    Sep. 13, 2018

(51) Int. Cl.
| | | |
|---|---|---|
| *H04B 10/116* | (2013.01) | |
| *G02B 5/22* | (2006.01) | |
| *H04W 12/08* | (2009.01) | |

(52) U.S. Cl.
CPC .......... *H04B 10/116* (2013.01); *G02B 5/22* (2013.01); *H04W 12/08* (2013.01)

(58) Field of Classification Search
CPC ........................................................ G02B 5/22
See application file for complete search history.

(56) References Cited

U.S. PATENT DOCUMENTS

| | | | |
|---|---|---|---|
| 9,379,288 B2 | 6/2016 | Choi et al. | |
| 2004/0218260 A1* | 11/2004 | Simpson | B32B 7/12 359/359 |
| 2005/0099678 A1* | 5/2005 | Wang | G02B 5/208 359/359 |
| 2009/0084994 A1* | 4/2009 | Simpson | B32B 17/10 250/517.1 |
| 2010/0135669 A1 | 6/2010 | Kim et al. | |
| 2011/0044695 A1* | 2/2011 | Jun | H04B 10/1149 398/130 |
| 2011/0183241 A1* | 7/2011 | Lin | G03G 5/14704 430/56 |
| 2011/0228399 A1* | 9/2011 | Ohnishi | G02B 5/281 359/586 |
| 2013/0128333 A1* | 5/2013 | Agrawal | G02F 1/157 359/273 |

(Continued)

FOREIGN PATENT DOCUMENTS

WO    WO 2016/038353    3/2016

OTHER PUBLICATIONS

IEEE 802.15.7-2011—"IEEE Standard for Local and Metropolitan Area Networks—Part 15.7: Short-Range Wireless Optical Communication Using Visible Light", Abstract, Sep. 6, 2011.

(Continued)

*Primary Examiner* — Omar S Ismail
(74) *Attorney, Agent, or Firm* — Cindy Kaplan

(57) ABSTRACT

In one embodiment, an apparatus includes a filter operable to block visible light from passing through a transparent structure at a wavelength corresponding to the wavelength used by a visible light communications network operable in an area containing the transparent structure. The filter is operable to provide security in the visible light communications network while allowing at least some visible light to pass through the transparent structure.

15 Claims, 4 Drawing Sheets

(56) References Cited

U.S. PATENT DOCUMENTS

| | | | |
|---|---|---|---|
| 2014/0072119 A1* | 3/2014 | Hranilovic | H04L 9/3215 |
| | | | 380/270 |
| 2014/0270791 A1* | 9/2014 | Hyde | H04B 10/116 |
| | | | 398/118 |
| 2015/0234218 A1* | 8/2015 | Aoyama | G02F 1/13306 |
| | | | 349/33 |
| 2015/0319639 A1 | 11/2015 | Poola et al. | |
| 2016/0056893 A1* | 2/2016 | Wu | H04B 10/116 |
| | | | 250/578.1 |
| 2016/0155789 A1* | 6/2016 | Kim | H01L 27/3272 |
| | | | 257/40 |
| 2016/0327853 A1* | 11/2016 | Sarma | G03B 21/567 |
| 2016/0351764 A1* | 12/2016 | Cha | H01L 33/58 |
| 2017/0012188 A1 | 1/2017 | Park et al. | |
| 2018/0106443 A1* | 4/2018 | Shannin | F21S 19/005 |
| 2018/0248621 A1* | 8/2018 | Lenssen | H04B 10/5563 |

OTHER PUBLICATIONS http://www.lifi-centre.com/about-li-fi/applications/, Applicatons of Li-Fi, Page accessed Jan. 2, 2017.

* cited by examiner

VISIBLE LIGHT COMMUNICATIONS NETWORK WAVELENGTH FILTER FOR SECURITY AT TRANSPARENT STRUCTURES

TECHNICAL FIELD

The present disclosure relates generally to communication networks, and more particularly, to security for visible light communications networks.

BACKGROUND

Emerging technologies allow for high-bandwidth transmission of data by modulation of visible light. Li-Fi (Light Fidelity) is one example of wireless communication based on the use of visible light communications (VLC). Li-Fi uses visible light communications to send data at extremely high speeds and may operate as a bidirectional fully networked wireless communications technology. Li-Fi is expected to become more common in workspaces in the coming years. With bandwidth rates that are faster than traditional Wi-Fi, enterprises and consumers will likely adopt the medium for mobile client network connectivity.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
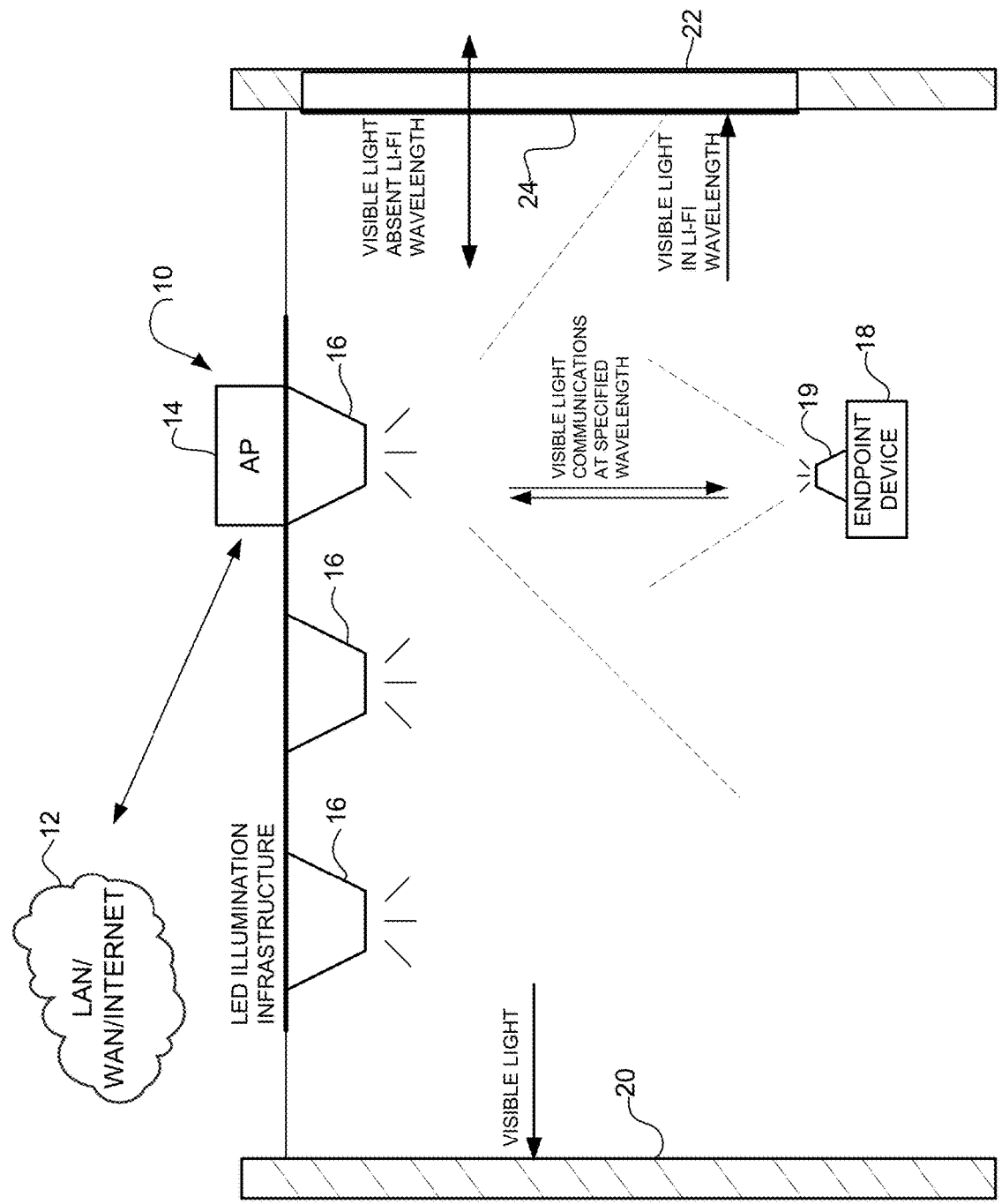
FIG. 1 illustrates an example of a network in which embodiments described herein may be implemented.

In one embodiment, an apparatus generally comprises a filter operable to block visible light from passing through a transparent structure at a wavelength corresponding to the wavelength used by a visible light communications network operable in an area containing the transparent structure. The filter is operable to provide security in the visible light communications network while allowing at least some visible light to pass through the transparent structure.

In another embodiment, a system generally comprises an access point comprising a light module operable to transmit data at a specified wavelength in a visible light communications network and a filter configured to prevent visible light at the specified wavelength of operation of the light module in the visible light communications network from passing through a transparent structure. The filter is operable to provide security in the visible light communications network while allowing at least some visible light to pass through the transparent structure.

In yet another embodiment, a system generally comprises an access point comprising a light module transmitting data at a specified wavelength in a visible light communications network, a transparent structure located in an area containing the access point, and a filter preventing visible light at the specified wavelength of operation of the light module in the visible light communications network from passing through the transparent structure. The filter provides security in the visible light communications network while allowing at least some visible light to pass through the transparent structure.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Visible Light Communications (as being defined in IEEE 802.15.7 WPAN Task Group 7 (TG7) Visible Light Communications) is a Wireless Personal Area Network (WPAN) standard using visible light communications and is commonly known as Visible Light Communications (VLC) or Li-Fi (Light Fidelity). Li-Fi is similar to Wi-Fi in that both technologies may be used to transmit data electromagnetically. However, Wi-Fi uses radio waves while Li-Fi runs on visible light. Li-Fi transmits data using lights that flicker on and off within nanoseconds, imperceptible to the human eye. Li-Fi provides many advantages over conventional technology. For example, Li-Fi allows the number of points of network access to be increased without running the risk of saturating frequencies in the electromagnetic spectrum by taking advantage of the many light fixtures installed in houses, offices, transportation, and public spaces. Li-Fi is also of interest for security reasons because the zone of coverage is visible to the naked eye and limited to the zone of illumination.

Li-Fi and Wi-Fi share a common challenge, which is non-physical accessibility by untrusted parties. Unlike Wi-Fi signals that can penetrate walls, Li-Fi is based on light and cannot penetrate walls. Although Li-Fi cannot pass through walls, it can pass through internal and external windows of a structure. Windows are often prevalent throughout office spaces, homes, or other environments in which a secure connection is desired.

The embodiments described herein prevent the traversal of visible light communications (e.g., Li-Fi) through a transparent structure, without interfering with the general traversal of existing non-Li-Fi light. One approach to preventing Li-Fi access from outside a window is to close a curtain or utilize a barrier that prevents the transmittal of light through the window, thereby preventing general use of the window. Since light from a window is often used to provide additional light to a work space and a worker may want to have a view through the window, blockage of all light from passing through the window is generally not desired. The embodiments described herein address a common security concern, which would prevent Li-Fi from being implemented in areas of a building where non-secured access may exist outside an exterior or interior window. The embodiments may be used to prevent unauthorized access to Li-Fi networks by users who attempt to access the network through a window or other transparent structure, while still allowing light to pass through the window.

Referring now to the drawings, and first to FIG. 1, an example of a network and environment in which embodiments described herein may be implemented is schematically shown. The embodiments may operate in the context of a data communications network including multiple network devices. In the example shown in FIG. 1, a Li-Fi (VLC) network, generally indicated at 10, is in communication with a Local Area Network (LAN) and Wide Area Network (e.g., Internet) 12. The Li-Fi network 10 may be in communication with any number of networks, which may include any number of network devices in communication via any number of nodes to facilitate passage of data within the network. For example, the Li-Fi network 10 may be in communication with one or more networks (e.g., LAN, WAN, metropolitan area network (MAN), virtual private network (VPN), virtual local area network (VLAN), wireless network, enterprise network, corporate network, data center, Internet, intranet, radio access network, public switched network, or any other network). The Li-Fi network 10 may provide features such as directional lighting, energy efficiency, intrinsic security through signal blocking by walls, high data rate capability, and integrated networking capability. Compared to Wi-Fi, Li-Fi is expected to have more bandwidth available in a more localized manner. Furthermore, Li-Fi will support larger bandwidths than Wi-Fi as there is more frequency spectrum available for transmissions in a more localized manner. The Li-Fi network 10 may operate, for example, in accordance with IEEE 802.15.7 "Short-Range Wireless Optical Communication Using Visible Light," Sep. 6, 2011, the contents of which are incorporated by reference herein.

The Li-Fi network 10 includes one or more Li-Fi (VLC) access points (APs) 14. The AP 14 connects to one or more light modules 16 to provide power and modulate the light to deliver data. The light modules 16 may comprise, for example Light Emitting Diodes (LEDs) or other suitable light source illumination infrastructure. The LEDs are suitable for transmitting data in the optical spectrum and may transmit data by modulation of visible light. The visible light may also concurrently provide illumination to an area. The LEDs may be connected to a suitable modulating component, such as a microcontroller (not shown). The AP 14 may use LEDs for speeds in the hundreds of Mb/s range, for example. Data modulation on the visible light is not perceived by and harmless to human eyes. The Li-Fi network 10 may use, for example, visible light between frequencies of 460 nm and 645 nm (or other range) for communicating with one or more endpoint devices 18. Each light 16 may provide a separate data channel and each channel may supply different data into each separate pool of light, delivered at the full rated download speed for that channel. The access area of each channel is the width of the light pool and may be accessed by multiple users. In the example shown in FIG. 1, the LEDs are mounted on a ceiling, however, the lights 16 may be mounted on any suitable surface.

The endpoint device (endpoint, network device, VLC device, station, client device, client) 18 is communicatively coupled to the AP 14 via the Li-Fi network 10. The endpoint device 18 may include, for example, a smart phone, tablet, netbook, ultrabook, laptop, personal digital assistant, desktop, printer, camera, or any other mobile or stationary computing device with Li-Fi capability. The endpoint device 18 shown in the example of FIG. 1 includes a light source 19 and interface supporting VLC/Li-Fi bidirectional connectivity. In another example, the endpoint device 18 may connect to a desktop unit comprising the light module 19, via a USB, for example, in order to provide the device access to the Li-Fi network 10. As previously noted, the AP 14 may provide connectivity for the endpoint 18 to access the Internet, LAN, WAN, VPN, and the like. The AP 14 and endpoint 18 may each include a transmitter for transmitting visible light signals and a receiver for receiving visible light signals, thus providing bidirectional connectivity.

As previously described, Li-Fi is localized, shared light access and will not propagate through walls 20 or other physical barriers. The spatial coverage of the Li-Fi network is therefore limited by its area of illumination and physical structure in its vicinity, such as walls 20 or ceilings through which light cannot penetrate. However, transparent structures, such as window 22 will not prevent transmittal of Li-Fi signals. One or more embodiments allow Li-Fi networks to be secured from access outside of the window (or other transparent structure such as a glass wall or ceiling) by providing a filter 24, which blocks light at the operating frequency of the Li-Fi network, while allowing visible light at other frequencies to pass therethrough.

In one or more embodiments, Li-Fi isolation is provided through the application of a frequency specific physical filter 24 to transparent solid surface 22. The filter 24 provides a layer of filtration, which is tuned to a specific wavelength range (nm) based on the Li-Fi LED emitters utilized for network services. For example, Li-Fi may operate at a specific wavelength (e.g., anywhere between 460 nm and 645 nm, depending on the color of the LED emitter). The embodiments described herein may be used to isolate or prevent only the specific Li-Fi wavelength from traversing the transparent structure 22. As described below, the filter 24 is configured to block the specified wavelength of operation of the Li-Fi network.

Figure 2:
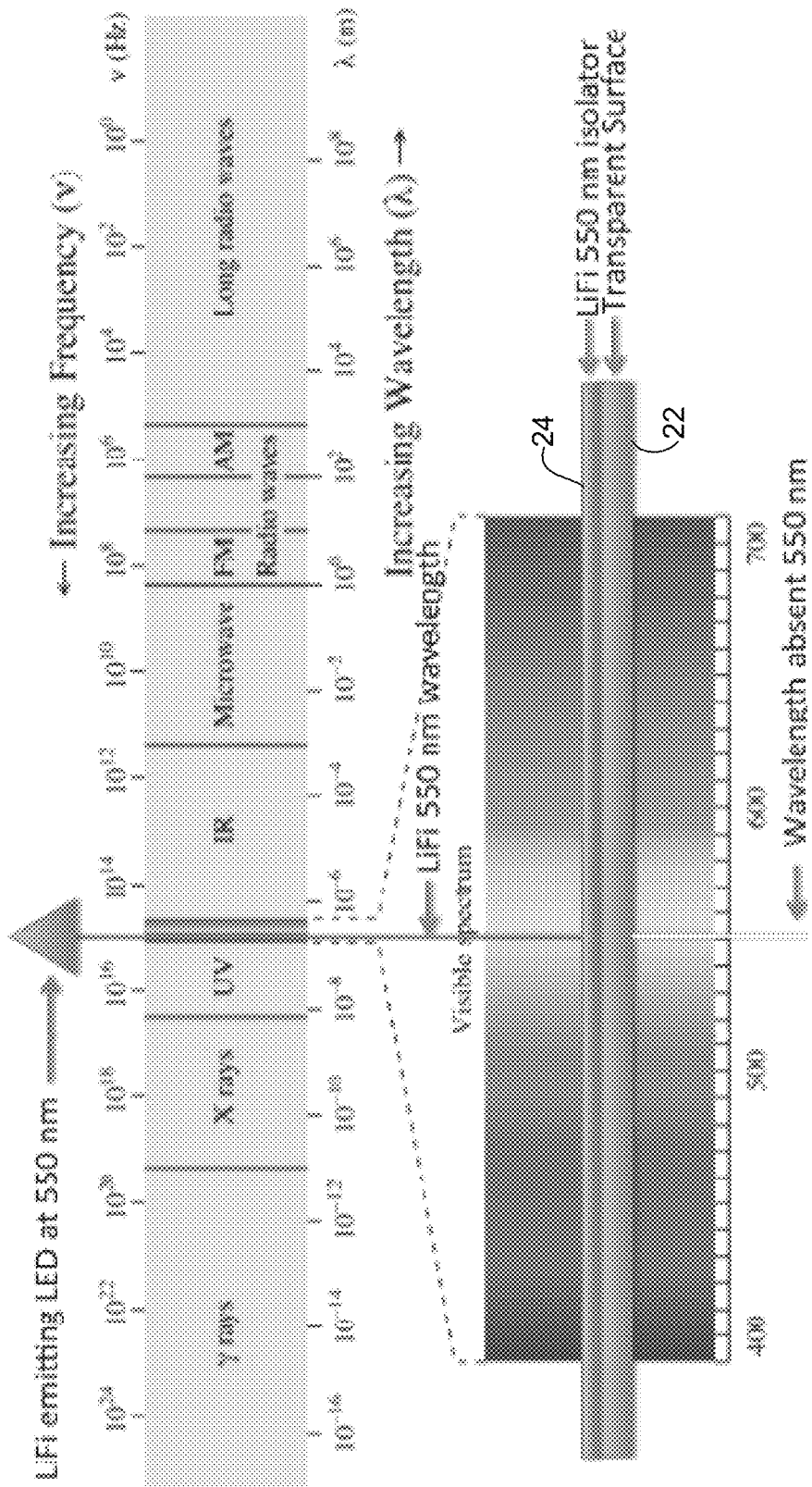
FIG. 2 is a schematic illustrating a transparent barrier in a light spectrum for implementation in the network of FIG. 1, in accordance with one embodiment.

FIG. 2 illustrates an example of wavelength isolation at the filtration device 24 applied to the transparent surface 22, shown in the network of FIG. 1. The visible light spectrum is shown at approximately 390 nm to 710 nm in the example of FIG. 2. In this example, the broad wavelength spectrum of visible light with a known Li-Fi wavelength of 550 nm is filtered by the Li-Fi isolator 24. The filter 24 provides a physical barrier that will block the traversal of Li-Fi communications through transparent structure 22 (e.g., window in FIG. 1). In one or more embodiments, all other visible light is permitted to traverse the transparent surface 22 unimpeded, with the exception of the wavelength emitted by the LED providing Li-Fi based network access.

In the example shown in FIG. 2, the filter 24 is configured to block (prevent, isolate, absorb) transmission at 550 nm. It is to be understood that the filter 24 may be configured to block other wavelengths or range of wavelengths based on the operating spectrum of the Li-Fi network. Thus, the filter 24 may be configured to block the specific wavelength at which the Li-Fi network operates, which may include one or more wavelengths, or wavelength range or ranges in the visible light spectrum (e.g., anywhere between 380 nm and 780 nm, anywhere between 460 nm and 645 nm, or any other range or specific wavelength).

Figure 3:
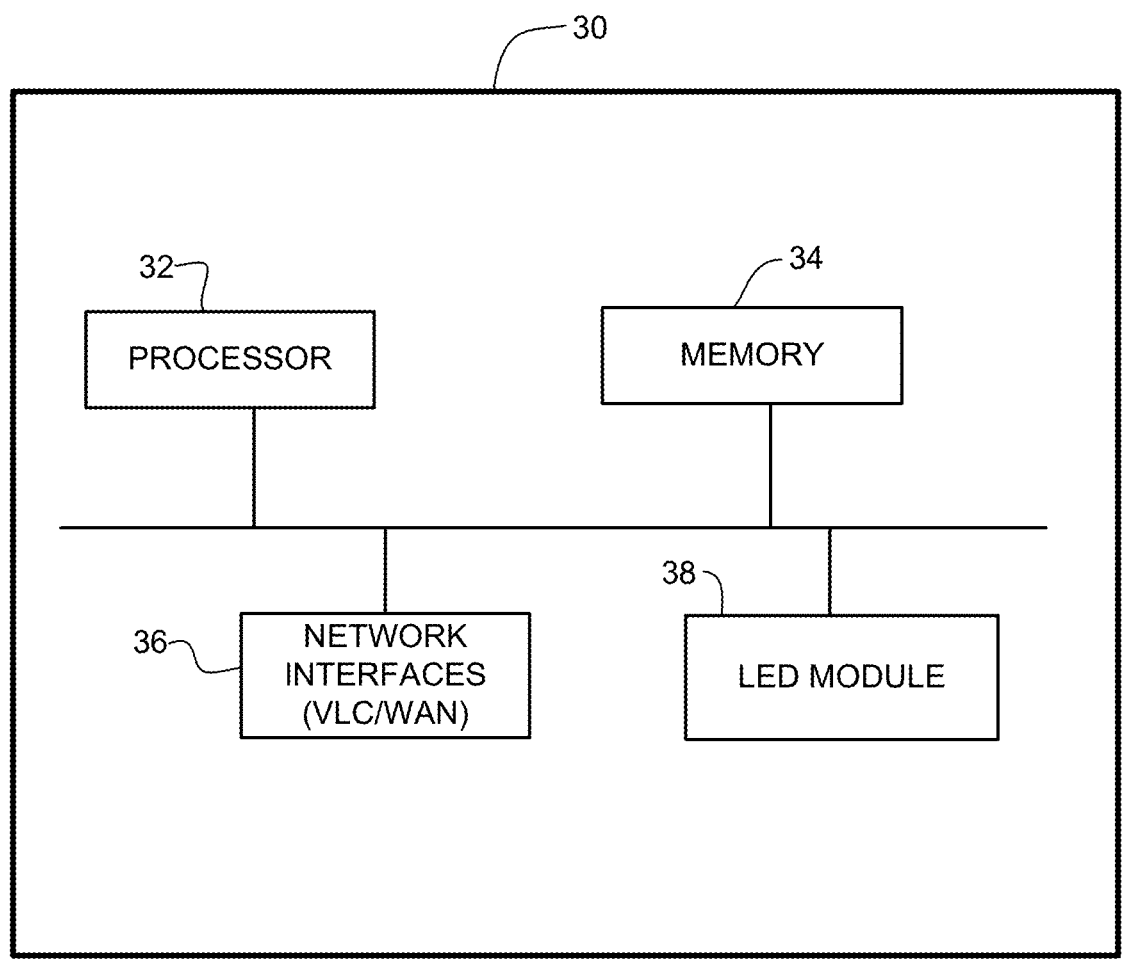
FIG. 3 depicts a network device that may be used in the network of FIG. 1, in accordance with one embodiment.

FIG. 3 illustrates an example of a VLC network device 30 (e.g., AP 14 in FIG. 1) that may be used in the VLC (Li-Fi) network 10. In one embodiment, the network device 30 is a programmable machine that may be implemented in hardware, software, or any combination thereof. The VLC network device 30 includes one or more processor 32, memory 34, network interfaces 36, and LED module 38.

Memory 34 may be a volatile memory or non-volatile storage, which stores various applications, operating systems, modules, and data for execution and use by the processor 32. For example, components of a controller (e.g., code, logic, etc.) may be stored in the memory 34. The network device 30 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 30 may include any number of processors 32.

The network interfaces 36 may comprise any number of VLC (Li-Fi) interfaces for receiving data or transmitting data to other VLC devices (e.g., endpoint 18 of FIG. 1) and linecards or ports (e.g., Ethernet interface) for receiving data or transmitting data to other networks (e.g., LAN 12 in FIG. 1). The network interfaces 36 may further include elements such as controllers, buffers, caches, drivers, receivers, and the like, to enable communications.

The LED module 38 may comprise a single or plurality of LEDs operable to emit visible light. The LED module 38 is turned on, turned off, and flickered by an illumination driver of a controller (not shown). The LED module 38 may include light emitting elements that transmit modulated data on visible light and light sensing elements that receive modulated data on visible light.

It is to be understood that the VLC network device 30 shown in FIG. 3 and described above is only an example and that different configurations of network devices may be used. For example, the VLC network device 30 may further include any suitable combination of hardware, software, algorithms, processors, memory, devices, components, or elements operable to facilitate the capabilities described herein.

Figure 4A:
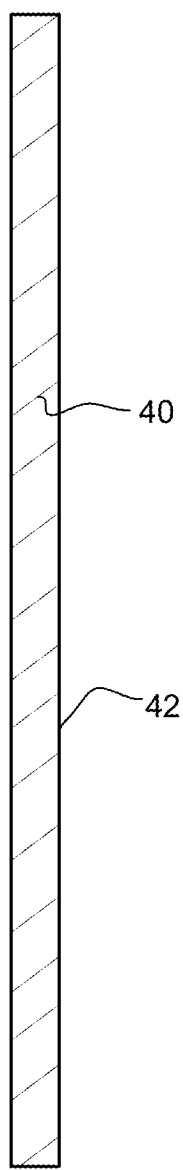
FIG. 4A illustrates a transparent structure comprising an embedded Li-Fi filter, in accordance with one embodiment.

FIG. 4A illustrates an example of a filter 40 embedded into a transparent structure 42. The transparent structure 42 may comprise, for example, a window, wall, ceiling, etc. and may be located on an external surface of a building, internal structure of a building, or be part of a transportation device (e.g., window in a car, bus, train, etc.). The embedded filter 40 may comprise, for example, a polarizing filter wherein a manufacturing process inserts the isolation method into glass or polymer at the time of manufacture. Materials such as carbon, aluminum, and silica may be embedded into the glass as nanoparticles and configured to absorb the operating frequency of the Li-Fi network, for example.

Figure 4B:
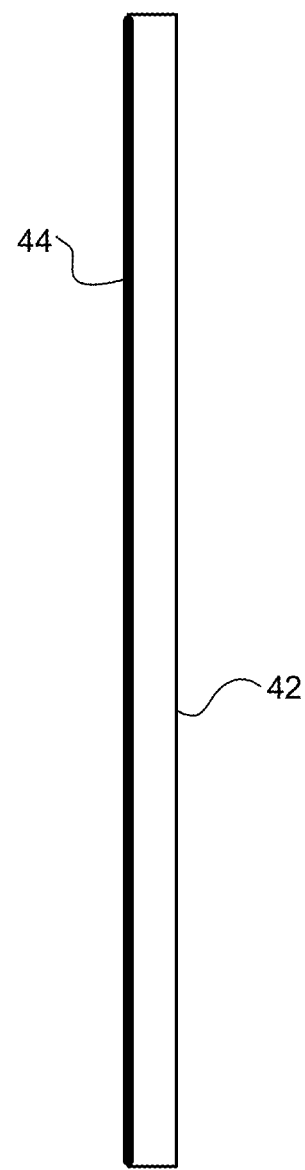
FIG. 4B illustrates a transparent structure with an overlay comprising a Li-Fi filter, in accordance with one embodiment.

FIG. 4B illustrates a filter overlay 44 applied or attached to the transparent structure 42. The filtration layer 44 may be formed from ceramic, carbon, metal, or other suitable material operable to block the operating Li-Fi wavelength while allowing other visible light to pass therethrough. The filter 44 may comprise a film that may be removably applied to an existing window. Different films may be applied to windows based on the operating frequency of the Li-Fi network to prevent access to the Li-Fi network from unauthorized physical locations outside of a specified area (e.g., office, room, building).

The term "transparent structure" as used herein may refer to a transparent or semi-transparent surface that allows at least a portion of the visible light spectrum to pass therethrough. As previously noted, the transparent structure may be internal to a building or located within an exterior wall of a room, office, house, building, business, hospital, residence, government or military facility, public area, transportation vehicle, or other contained stationary or movable area. The structure shown in the example of FIGS. 4A and 4B is flat, however, the transparent structure may also be curved. Also, the filter 42, 44 may be configured to block more than one frequency if downlink and uplink transmissions in the Li-Fi network take place on different frequencies. If the filter comprises an overlay 44, as shown in FIG. 4B, two separate films may be applied, one configured to block signals at a first wavelength range and another configured to block signals at a second wavelength range.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An apparatus comprising:
    a filter operable to block visible light from passing through a glass window in a room at a wavelength corresponding to the wavelength used by a visible light communications network operable in the room with the glass window and an endpoint device in communication with the visible light communications network;
    wherein the filter is configured to block the visible light at the wavelength used by the visible light communications network to provide security in the visible light communications network while allowing at least some visible light to pass into the room through the glass window; and
    wherein the filter comprises material embedded into the glass as nanoparticles and configured to absorb the visible light at the wavelength used by the visible light communications network.

2. The apparatus of claim 1 wherein the filter is configured to block a specific wavelength range at which light emitters in the visible light communications network are configured to operate.

3. The apparatus of claim 1 wherein the filter comprises a polarizing media.

4. The apparatus of claim 1 wherein the filter is embedded into the glass window during manufacturing of the glass window.

5. A system comprising:
    an access point comprising a light module operable to transmit data at a specified wavelength in a visible light communications network; and
    a filter configured to prevent visible light at the specified wavelength of operation of the light module in the visible light communications network from passing through a glass window in a room with the visible light communications network;
    wherein the filter is operable to provide security in the visible light communications network while allowing at least some visible light to pass into the room through the glass window and wherein the data is transmitted and received at different wavelengths and the filter is configured to block visible light at both of said wavelengths; and
    wherein the filter comprises two filters, each of said filters configured to block signals at a transmitting wavelength or a receiving wavelength.

6. The system of claim 5 wherein the filter comprises two overlays, wherein one of said overlays or both of said overlays may be applied to a surface of the glass window.

7. The system of claim 5 wherein the filter is embedded within the glass window.

8. The system of claim 5 wherein the filter is configured to block the visible light at a specified range location between frequencies of 460 nm and 645 nm.

9. The system of claim 5 wherein the filter comprises a polarizing media.

10. A system comprising:
- an access point comprising a light module transmitting data at a specified wavelength in a visible light communications network;
- a glass window located in a room with an endpoint communicatively coupled to the access point via the visible light communications network; and
- a filter preventing visible light at the specified wavelength of operation of the light module in the visible light communications network from passing through the glass window;
- wherein the filter provides security in the visible light communications network while allowing at least some visible light to pass into the room through the glass window and wherein the data is transmitted and received at different wavelengths and the filter is configured to block visible light at both of said wavelengths; and
- wherein the filter comprises two overlays, each of said overlays configured to block signals at one of said different wavelengths.

11. The system of claim 10 wherein the light module further comprises a receiver for receiving data at a specified wavelength.

12. The system of claim 10 wherein the filter comprises a film configured for application to the glass window.

13. The apparatus of claim 1 wherein the data is transmitted and received at different wavelengths and the filter is configured to block visible light at both of said wavelengths.

14. The system of claim 10 wherein the filter is configured to block the visible light at a specified range located between frequencies of 460 nm and 645 nm.

15. The apparatus of claim 1 wherein the filter is configured to block the visible light at a specified range located between frequencies of 460 nm and 645 nm.

\* \* \* \* \*